(12) United States Patent
Bertrand, III

(10) Patent No.: US 9,493,711 B2
(45) Date of Patent: Nov. 15, 2016

(54) PROCESSES AND COMPOSITIONS FOR SCAVENGING HYDROGEN SULFIDE

(71) Applicant: Coastal Chemical Co., L.L.C., Abbeville, LA (US)

(72) Inventor: Roy Bertrand, III, Abbeville, LA (US)

(73) Assignee: Coastal Chemical Co., L.L.C., Abbeville, LA (US)

( * ) Notice: Subject to any disclaimer, the term of this patent is extended or adjusted under 35 U.S.C. 154(b) by 379 days.

(21) Appl. No.: 14/134,286

(22) Filed: Dec. 19, 2013

(65) Prior Publication Data

US 2014/0171721 A1 Jun. 19, 2014

Related U.S. Application Data

(60) Provisional application No. 61/797,957, filed on Dec. 19, 2012.

(51) Int. Cl.
| | |
|---|---|
| *C07C 7/152* | (2006.01) |
| *C07C 7/148* | (2006.01) |
| *C10G 21/27* | (2006.01) |
| *C10G 21/20* | (2006.01) |
| *C10L 3/10* | (2006.01) |

(52) U.S. Cl.
CPC ............... *C10G 21/27* (2013.01); *C10G 21/20* (2013.01); *C10L 3/103* (2013.01); *C10G 2300/202* (2013.01)

(58) Field of Classification Search
CPC ............................. C07C 7/152; C07C 7/148
USPC .......................... 585/862, 860; 208/237, 238
See application file for complete search history.

(56) References Cited

U.S. PATENT DOCUMENTS

| | | | |
|---|---|---|---|
| 4,266,054 A | 5/1981 | Au | |
| 4,830,827 A | 5/1989 | Au et al. | |
| 5,347,004 A | 9/1994 | Rivers et al. | |
| 5,554,349 A | 9/1996 | Rivers et al. | |
| 5,744,024 A | 4/1998 | Sullivan, III et al. | |
| 6,299,836 B1 | 10/2001 | Veldman et al. | |
| 6,663,841 B2 | 12/2003 | Salma et al. | |
| 7,438,887 B2 | 10/2008 | Suib et al. | |
| 2008/0056974 A1 | 3/2008 | Salma et al. | |
| 2011/0220551 A1 | 9/2011 | Taylor | |
| 2012/0247515 A1 | 10/2012 | Taylor | |

FOREIGN PATENT DOCUMENTS

WO     WO 02/086021 A1    10/2002

OTHER PUBLICATIONS

Weatherford Material Safety Data Sheet—HW 4588 Catalog Feb. 21, 2012 12 pages.
Weatherford Material Safety Data Sheet—HW 4935 Catalog Nov. 25, 2013 10 pages.
Taylor, et al., "Identification of the Molecular Species Responsible for the Initiation of Amorphous Dithiazine Formation in Laboratory studies of 1,3,5-Tris (hydroxyethyl)-hexahydro-s-triazine as a Hydrogen Sulfide Scavenger", Industrial & Engineering Chemistry Research, 2012, 51, 11613-11617.
"Hydrogen Sulfide Management: Mitigation options in petroleum refining, storage and transportation," Baker Hughes White Paper, 2011, Sugar Land, TX.
Taylor, et al., "Structural Elucidation of the Solid Byproduct from the Use of 1,3,5-Tris(hydroxyalkyl)hexahydro-s-triazine Based Hydrogen Sulfide Scavengers", Industrial & Engineering Chemistry Research, 2011, 50, 735-740.

*Primary Examiner* — Thuan D Dang
(74) *Attorney, Agent, or Firm* — Garvey, Smith, Nehrbass & North, L.L.C.; Seth M. Nehrbass; Mackenzie D. Rodriguez

(57) ABSTRACT

Processes and compositions for scavenging hydrogen sulfide from hydrocarbon streams are disclosed that reduce, if not substantially eliminate, the formation of crystalline or amorphous solids even under cold conditions. The compositions used in the processes comprise a hexahydrotriazine component and an amphiphilic component that form a hydrophobic micelle when the hexahydrotriazine component becomes spent.

10 Claims, No Drawings

PROCESSES AND COMPOSITIONS FOR SCAVENGING HYDROGEN SULFIDE

CROSS-REFERENCE TO RELATED APPLICATIONS

This is a nonprovisional of U.S. Provisional Patent Application Ser. No. 61/797,957, filed on 19 Dec. 2012, which is hereby incorporated herein by reference.

Priority of U.S. Provisional Patent Application Ser. No. 61/797,957, filed on 19 Dec. 2012, incorporated herein by reference, is hereby claimed.

FIELD OF THE INVENTION

This invention pertains to processes and compositions for scavenging hydrogen sulfide from hydrocarbon streams, especially gas streams, and more particularly to processes using hexahydrotriazines that are capable of forming solids.

BACKGROUND

The removal of hydrogen sulfide from hydrocarbon streams, especially gas streams, is often required in order to meet many pipeline and storage regulations. Hydrogen sulfide and mercaptans are toxic and have an offensive odor, and these components can be adverse to downstream process equipment. Even in situations where the gas stream is flared, the presence of hydrogen sulfide and mercaptans result in the generation of pollutants such as sulfur dioxide and removal of these sulfur compounds may be mandated.

Numerous processes have been proposed for the removal of hydrogen sulfide and mercaptans including adsorption, absorption and reactions with chemical agents. Since it is desired to remove hydrogen sulfide and mercaptans at the source of the hydrocarbon stream in order to permit pipeline transport and storage or flaring, the processes need to be able to be operated under the conditions of the environment at the source. Often, the sources are remotely located and may be subject to harsh environments such as would be the case with natural gas wells. Because of such remote locations, minimization of operating problems is particularly desirable.

One type of process for removal of hydrogen sulfide uses hydrogen sulfide scavengers that react with hydrogen sulfide to provide a substantially non-toxic compound or a compound which can be removed from the hydrocarbon. Currently most frequently used hydrogen sulfide scavengers are hexahydrotriazines from monoethanolamine (MEA triazine) and methylamine (MMA triazine). These triazines are readily deployable in scrubbers or in a production train that can be physically located adjacent to hydrocarbon sources such as gas wells, are effective scavengers, and result in the formation of dithiazines. Moreover MEA triazine and MMA triazine are readily available at reasonable costs. Nevertheless, especially under colder conditions, these triazines are susceptible to the formation of solids, especially dithiazine deposits, that can result in operational difficulties and the necessity for maintenance of the scrubber system. Removal of solid deposits can be difficult and result in lost operational time. Recently, Taylor in U.S. published patent application No. 2012/0247515 summarized the problems caused by amorphous solids formation stating that:

"Cleaning procedures are time consuming and difficult. Often, the equipment has to be taken off-line so that the deposits can be manually chipped away. The industry places much effort and incurs great cost in the treatment of amorphous dithiazine buildup." (paragraph 0003)

Taylor proposes the use of hydrogen peroxide to react and dissolve amorphous dithiazine deposits.

Taylor, et al., "Identification of the Molecular Species Responsible for the Initiation of Amorphous Dithiazine in Laboratory studies of 1,3,5-Tris(hydroxyethyl)-hexahydro-s-triazine as a Hydrogen Sulfide Scavenger", Industrial & Engineering Chemistry Research, 2012, 51, 11613-11617, note that MEA triazine can form cubic crystals or amorphous dithiazine solids. The authors relate at page 11613 that when the MEA triazine is spent to a high-level, or when the reaction with hydrogen sulfide has proceeded very far along, it's pathway to the dithiazine exceeds solubility in the aqueous medium and comes out of solution as a lower, highly dense liquid layer. They state that once this liquid layer is formed, solids can occur. While the crystalline dithiazine can be melted or removed with an appropriate solvent, the amorphous dithiazine is typically insoluble in all organic solvents and does not melt. The authors identified a potential mechanism for the formation of the amorphous dithiazine involving an attack by bisulfide on the nitrogen moiety of the dithiazine to form complex oligomeric or polymeric structures.

Taylor, et al., state in the last paragraph on page 11613:

"Avoidance is the best current strategy for amorphous dithiazine, either by preventing the initial phase separation with co-solvency or ensuring that the degree of spent does not reach a level sufficient to cause its formation."

Referencing their prior work, the authors state at page 11614 that the presence of a terminal hydroxyl functionality in the hexahydrotriazines molecule is essential for the amorphous dithiazine to form. If this is blocked with a methoxy group, as with 2-methoxy ethyl or 3-methoxy propyl hexahydrotriazines, no solidification of the separated dithiazine layer was observed by them at complete spent condition.

MMA triazine tends to form crystals when spent although it is a very reactive hydrogen sulfide scavenger. Due to the common method of manufacture of the MMA triazine, it is usually present in an aqueous concentrate containing about 30 to 40 weight percent MMA triazine. The dithiazine from MMA triazine is subject to additional attack by these sulfur compounds to results in ring opening. MMA triazine tends to be more expensive than MEA triazine.

Accordingly, a need still exists for hydrogen sulfide scavengers that are cost-effective, can be employed at remote locations in existing scrubbing equipment, and do not result in the formation of crystalline or amorphous solids.

Although the commercial hydrogen sulfide scavenging products today are based on MEA triazine and MMA triazine, investigators have proposed numerous triazines for use as hydrogen sulfide scavengers. Au, et al., in U.S. Pat. No. 4,830,827 discloses a wide variety of hexahydrotriazine derivatives including acyclic, heterocyclic, hydroxy and mercaptans of substituted acyclic heterocyclic, amido, acyl, ether, thioether, mercapto and the like derivatives. The compounds are stated to be capable of inhibiting corrosion. Example 4 illustrates the corrosion protection afforded by the compounds in the presence of hydrogen sulfide at a concentration of 50 ppm. Rivers, et al., in U.S. Pat. Nos. 5,347,004 and 5,554,349 discloses the use of a mixture of amines wherein at least one of the amines is a hexahydrotriazines having an alkoxyalkylene radical such as a mixture of MMA triazine and 1,3,5 tris-(3-methoxypropyl)-hexatriazine (MOPA triazine). The patentees provide no disclosure regarding a solids problem. They state at column 6, lines 12 et seq., that it has been discovered that where both methylamine and MOPA are used together to make the main mixture, that the effectiveness of the mixture increases with increasing MOPA portion relative to methylamine. They further add that since MOPA is presently relatively more expensive than methylamine, economic considerations may prefer relatively more methylamine as the main component.

Taylor in U.S. published patent application No. 2011/0220551 discloses hydrogen sulfide scavengers that are triazines made from an aldehyde and at least one aminoalkylalkanolamine and at least one primary alkyl amine. The manufacturing process is said to produce a mixture of triazines. In comparative example 4, the applicant discloses two syntheses of a mixed triazine containing moieties of differing hydroxyethyl and methyl substituents. Example 5 reports that the activity of the mixed triazines of Example 4 is essentially the same performance as a mixed triazine of aminoethylethanolamine and t-butyl amine. No information regarding solids formation is disclosed.

Salma, et al., in U.S. Pat. No. 6,663,841 disclose a process form scavenging hydrogen sulfide from supercritical and/or liquid carbon dioxide. At column 2, lines 60 to 63, the patentees state:

"In one non-limiting embodiment, the preferred hexahydrotriazines include, but are not necessarily limited to, 1,3,5-tri-(2-hydroxyethyl)-hexahydro-S-triazine; 1,3,5-trimethylhexahydro-1,3,5-triazine; or mixtures thereof."

No specific disclosure is made of any mixture composition.

Sullivan, et al., in U.S. Pat. No. 5,744,024 propose the use of trisubstituted hexahydrotriazines in the presence of quaternary ammonium compound to treat sour gas and liquid hydrocarbon. The preferred scavenging triazines are substituted with alkoxyalkyl, alkyl, or alkanol moieties such as MOPA triazine, MMA triazine and MEA triazine. Salma, et al., in U.S. Pat. No. 7,438,887 disclose hexahydrotriazine scavengers having both hydroxyalkyl and alkylamine functionality. The patentees state that the triazines remove hydrogen sulfide rapidly and with high capacity and are manufactured from relatively low-cost materials. The patentees provide no information regarding solids formation.

Significant challenges are faced in developing new compositions for scavenging hydrogen sulfide. For instance, the scavenger should be capable of being used in relatively noncomplex equipment, such as existing scrubbers, at the site of the source of the hydrocarbon stream. Hence, the scavenger should be soluble in a delivery system such as water and be tolerant of other components that may be present in the hydrocarbon stream such as carbon dioxide. The scavenger needs to be economically competitive with existing scavengers including scavenging effectiveness and rate, maintenance and other operational costs and the cost of the scavenger itself. Accordingly, significant hurdles exist for the development of a scavenger, let alone a scavenger that also avoids formation of crystalline or amorphous solids.

SUMMARY

By this invention processes and compositions for scavenging hydrogen sulfide are provided that reduce, if not substantially eliminate the formation of crystalline or amorphous solids even under cold conditions. The processes and compositions of this invention are operable in existing scrubbing systems and for continuous injection in a production train for the removal of hydrogen sulfide from hydrocarbon streams, and are operable in the presence of water and are not adversely affected by the presence of carbon dioxide.

The processes and compositions of this invention involve the use of hexahydrotriazines that form micelles as the hexahydrotriazines become spent. Thus contrary to the prior teachings that phase separation should be prevented as a means to avoid the formation of solids, particularly amorphous solids, by this invention it has been found that the formation of a separate phase in the manner set forth herein enables retarding or avoiding the formation of solids.

While not wishing to be limited to theory, it is believed that the micelles have a hydrophobic exterior that retards the influx of water and sulfhydryl moieties that can enable the formation of crystalline and amorphous solids. The formation of the micelles is believed to occur as sulfhydryl moieties are ionically attracted to remaining tertiary nitrogen atoms in the triazine. This ionic attraction results in the sulfhydryl moieties having a hydrogen atom of enhanced positive polarity. The hydrophilic tail (having an oxygen atom) of an amphiphilic moiety can be attracted to this hydrogen atom and thus provide a micellular structure with an outwardly extending hydrophobic tail. In the preferred embodiments of this invention, the micelles are only substantially formed as the triazines become spent. Thus, the triazines can remain in or active at the surface of an aqueous phase to react with sulfhydryl moieties until they become spent. The micelles may become uniformly dispersed throughout a scrubbing solution and be stably dispersed, may immediately coalesce into a separately observable liquid phase, or may coalesce into a liquid phase only after standing. Since the composition is used in an environment where sulfhydryl moieties are gradually introduced for contact with the scavenger, a sulfhydryl lean environment exists that enables the ionic attraction of the amphiphilic moiety to the hydrogen atoms of enhanced positive polarity.

In the broad aspects of the invention, processes are provided for reducing an amount of sulfhydryl moieties in hydrocarbon streams comprising contacting in the presence of water and at least one amphiphilic moiety said hydrocarbon streams with at least one substituted hexahydrotriazine that is substantially devoid of hydroxyl groups but is soluble in water, for a time sufficient to provide a spent triazine in which at least one hetero nitrogen atom is replaced with a sulfur atom and wherein the amphiphilic moiety is provided in an amount sufficient to form a hydrophobic micelle with said spent triazine, with the proviso that the hexahydrotriazine and amphiphilic moiety are different.

The preferred substituted hexahydrotriazines can be represented by the formula

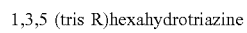

1,3,5 (tris R)hexahydrotriazine wherein each R is the same or different and may be alkyl including branched alkyl of 1 to 20, preferably 1 to 6, carbon atoms; aryl of 5 to 10 carbon atoms; alkoxyalkylene of 2 to 20, preferably 3 to 7, carbon atoms; and alkyleneamines of 1 to 20, preferably 2 to 6, carbon atoms.

The preferred amphiphilic moieties are hydroxyl or alkoxy-containing organic compounds having at least about 4, say, 4 to 20, carbon atoms and may be hexahydrotriazines substituted with hydroxyalkyl and alkoxyalkylene groups of 1 to 20 carbon atoms, preferably 2 to 6 carbon atoms. Representative amphiphilic moieties include, but are not limited to triazines such as MEA triazine, MOPA triazine, and 1,3,5 (tris-methoxyethyl) hexahydrotriazine and partially or fully spent derivatives thereof; benzyl alcohol, benzyl ethers of 1 to 6 carbons; phenol; and alkylphenolalkoxylates of up to 30 carbons, preferably with a low degree of alkoxyloxylation, e.g., 1 to 4 alkyleneoxy groups.

The molar ratio of triazines to amphiphilic moieties can vary over a wide range depending upon the chemical nature of the triazines and the amphiphilic moieties. In general, the preferred molar ratios fall in the range of between about 1:1 to 30:1 amphiphilic moieties per triazine.

The compositions of this invention, in the broad aspects, comprise at least one substituted hexahydrotriazine that is substantially devoid of hydroxyl groups but is soluble in water and at least one amphiphilic moiety in an amount sufficient to form a hydrophobic micelle with said triazine in the presence of hydrogen sulfide and water, with the proviso that the hexahydrotriazine and amphiphilic moiety are different. Where the amphiphilic moiety comprises MEA triazine, the mole ratio of hexahydrotriazine to MEA triazine is preferably less than about 0.3:1, say, about 0.03:1 to 0.2:1, and most preferably about 0.05:1 to 0.15:1.

The compositions may contain other components such as water; solvents and freeze point depressors such as methanol, ethanol, propanol, ethylene glycol and propylene glycol; antifoam agents and corrosion inhibitors. Typically the hexahydrotriazine and amphiphilic moiety comprise at least about 25, and often between about 30 and 70, mass percent of the compositions.

DETAILED DISCUSSION

As used herein, the following terms have the meanings set forth below unless otherwise stated or clear from the context of their use.

The use of the terms "a" and "an" is intended to include one or more of the element described.

An amphiphilic moiety is an organic compound having both hydrophilic groups and hydrophobic groups. The hydrophobic groups preferably contain at least about 3 carbon atoms and may contain hetero atoms less electronegative than oxygen such as silicon, sulfur, nitrogen and phosphorus provided that the hetero atoms are bonded to carbon atoms. The hydrophilic groups are preferably hydroxyl, alkoxyl, acyl, and carboxyl groups.

A hydrocarbon stream is a liquid or preferably gaseous stream containing hydrocarbon and may be an industrial or refining stream or a fossil fuel stream, e.g., from a well bore.

A hydrophobic micelle is an aggregate of triazine and amphiphilic moieties which is water insoluble and is not sufficiently hydrated to provide for the transport of bisulfide ions into the micelle. A hydrophobic micelle is also known as a reverse micelle. For purposes herein, the stability of a micelle evidences that there is no transport of transport of bisulfide ions into the micelle.

Ionically attracted means that van der Waals forces or similar forces attract molecules together, in some instances due to electrostatic actions such as between a hydroxyl oxygen and a sulfhydryl hydrogen, without the formation of a covalent or ionic bond.

A spent triazine is a thiadiazine, dithiazine or trithiane. It should be understood that a thiadiazine may become further spent and form a dithiazine, and a dithiazine may become further spent to form a trithiane. Although sulfhydryl moieties may become ionically attracted to and associated, but not reacted, with a nitrogen, this association is not determinative as to whether or not a triazine is spent.

As used herein, the term sulfhydryl is used in a manner inconsistent with its common meaning. The term sulfhydryl means compounds represented by the formula R—S—H wherein R is hydrogen or alkyl of 1 to 6 carbon atoms. A sulfhydryl has a bisulfide anion with the formula $HS^-$.

The term triazine as used herein refers to hexahydrotriazine.

This invention pertains to processes and compositions for scavenging sulfhydryl moieties from hydrocarbon streams in which the spent scavenger forms micelles that avoid or minimize the formation of solids.

A number of the triazines useful in the compositions of this invention are commercially available. Commercial triazines often contain components such as water or unreacted amine. Typically triazines are formed by reacting amines with an aldehyde, especially formaldehyde as is well known in the art. See, for instance U.S. Pat. No. 4,266,054. MMA triazine is a preferred triazine due to its reactivity with sulfhydryl moieties and its commercial availability and relatively low cost. Examples of other triazines include MOPA triazine; 1,3,5 (tris-methoxyethyl) hexahydrotriazine; 1,3,5 (tris-methoxybutyl) hexahydrotriazine; 1,3,5 (tris-ethyl) hexahydrotriazine and 1,3,5 (tris-propyl) hexahydrotriazine. The triazines can include compounds where each R group is the same or different. The preferred triazines have some water solubility, which solubility may be enhanced by the presence of solvent in the composition such as methanol. As the ring nitrogen atoms are replaced with sulfur atoms the compounds become less water soluble and may become substantially insoluble in water.

Again, without wishing to be limited to theory, it is believed that sulfhydryl moieties become ionically attracted to the remaining ring nitrogens. Thus it is believed that the spent triazine (which may be a thiadiazine or dithiazine) which is incorporated into the hydrophobic micelles contains sulfhydryl moieties. As discussed later in connection with examples, analysis of spent MOPA triazine indicates that while hydrogen sulfide is removed from natural gas in an amount commensurate with a reaction to provide the dithiazine, the scrubbing solution contained significant amounts of thiadiazine thus evidencing the ability of the spent triazines to attract, but not react with, sulfhydryl moieties.

Spent triazines that have hydroxyl groups, such as spent MEA triazine, do not readily form hydrophobic micelles that prevent the passage of water and sulfhydryl moieties into the micelle. This is believed to be caused by the presence of the hydroxyl group which, if not ionically attracted to the hydrogen of the sulfhydryl moiety associated with a ring nitrogen, serves to attract water and sulfhydryl moieties and disrupt the hydrophobic micelle formation. Accordingly, it is believed that hydrogen sulfide scavengers using MEA triazine alone are prone to the formation of amorphous solids as the scavenger becomes more spent and sulfhydryl moieties are attracted to the pendant hydroxyl group.

The amphiphilic moieties used in the compositions of this invention can be selected from a wide variety of compounds. In a preferred aspect of the invention, the amphiphilic moieties can comprise triazines that have polar groups that are capable of ionic attraction to the hydrogen atom of enhanced positive polarity of the sulfhydryl moiety. Hence, the efficacy of the scavenger composition is enhanced since both the triazine component and the amphiphilic moiety component serve to scavenge these sulfur compounds. The triazines that can serve as amphiphilic moieties have pendant hydroxyl or alkoxyl groups such as MEA triazine and MOPA triazine. As these triazines become spent, there hydrophobicity increases such that the thiadiazine or dithiazine ring structure serves as a hydrophobic tail. Additionally, the triazines that serve as amphiphilic moieties usually do not result in foaming of any scrubbing solution in which they are used.

Other amphiphilic moieties that can be used in lieu of or in addition to the amphiphilic triazines include, but are not limited to, benzyl alcohol, benzyl ethers of 1 to 6 carbons; phenol; phenol ethers; and alkylphenolalkoxylates of up to 30 carbons, preferably with a low degree of alkoxylation, e.g., 1 to 4 alkyleneoxy groups. Preferably, the other amphiphilic moieties provide hydrophobic tails that provide steric hindrance to enhance the stability of the hydrophobic micelle. Thus, branched alkyl and cyclic groups on the amphiphilic moieties are preferred. Desirably, the amphiphilic moieties have sufficient water solubility to be incorporated into the scavenger composition and remain solubilized until the formation of the hydrophobic micelles.

The relative amount of the triazine component to the amphiphilic moiety component will vary over a wide range depending upon the nature of each of the components. For instance, where MEA triazine is used as the amphiphilic moiety, it is believed that the hydrophilic tails can associate with sulfhydryl moieties on each of the triazine component and MEA triazine component. Accordingly, a high ratio of MEA triazine to triazine component is preferred. On the other hand, an amphiphilic moiety that is not a triazine will exclusively be attracted to the sulfhydryl moiety associated with the triazine and thus a much lower ratio of amphiphilic moiety to triazine will be required. In the former case, the mole ratio of triazine component to amphiphilic triazine component is typically in the range of between about 1:3 to 1:30, preferably between about 1:4 to 1:25. Where MMA triazine and MEA triazine are used, the mole ratio of MMA triazine to MEA triazine is preferably less than about 0.3:1, say, about 0.03:1 to 0.2:1, and most preferably about 0.05:1 to 0.15:1. In the latter case, the mole ratio of triazine component to amphiphilic moiety component tends to be in the range of about 1:1 to 1:20.

The ratio of the triazine component to the amphiphilic moiety component is sufficient to form hydrophobic micelles. As stated above, the micelles may be relatively small and not visually observable by the naked eye or may form a discernible, separate liquid phase. In some instances, the micelles may result in a colloidal haze. In certain aspects of the invention, the spent scavenger composition appears to the naked eye to be a single phase which can facilitate processing, particularly where liquid scrubbing of hydrocarbon gases is occurring, and thereby reduce the risk of formation of a separate, heavier phase, that must be handled. Additionally, in some instances, a spent scavenger composition which is substantially a single phase as a lower handling viscosity than a spent scavenger composition having two discernible liquid phases. In some instances it may be desired to have two liquid phases form during the scavenging such that the heavier, liquid phase containing spent triazines can be removed on a continuous or intermittent basis and replaced with fresh scavenger composition.

The scavenger compositions of this invention may also contain other additives to facilitate handling, enhancing solubility of triazines, avoiding operational problems such as foaming and the like. Typically the compositions will contain water either from being added or from being present in the other components of the composition. Solvents and freeze point depressors such as methanol, ethanol, propanol, ethylene glycol, propylene glycol, and the like can also be used. Other additives such as corrosion inhibitors in antifoam agents and scale inhibitors may find application in the compositions of this invention. Usually the mass ratio of total triazine (triazine component and any triazine used as the amphiphilic component) to the total composition is in the range of about 1:5 to 50:1, say about 1:4 to 10:1. The amount of solvent, when present, with respect to total triazine is often in the range of about 5 to 150, say, about 10 to 100, mass percent. Water, when present, typically comprises between about 5 and 60 mass percent of the composition.

In accordance with the processes of this invention, the scavenger composition is contacted with the hydrocarbon stream containing sulfhydryl moieties, especially hydrogen sulfide. The contacting can be effected in any convenient manner such as by injection of the scavenger composition into a process or transport line; passing the hydrocarbon stream such as a natural gas stream through a stirred or non-stirred vessel that contains the scavenger composition; or spraying or otherwise introducing the scavenger composition for contact with the hydrocarbon stream. In some instances, the scavenger composition can be introduced into a well hole. The hydrocarbon stream may contain other components depending upon source. Especially for natural gas streams, nitrogen, carbon dioxide and water are often present an advantage of the compositions of this invention is that the compositions are sufficiently robust to tolerate presence of other components in the hydrocarbon stream while still scavenging sulfhydryl moieties and retarding or avoiding the formation of solids. The hydrocarbon streams to be treated in accordance with this invention may contain up to about 5 or more volume percent, often between about 10 and 1000 parts per million by volume, sulfhydryl moiety.

The duration of the contact between the hydrocarbon stream and the scavenger composition in the scrubber is sufficient to provide a treated hydrocarbon stream substantially devoid of hydrogen sulfide, preferably less than about 1, and most preferably less than about 0.01, parts per million by volume of hydrogen sulfide. In most operations, the scavenger composition is used until an undesired breakthrough of hydrogen sulfide occurs in the treaded hydrocarbon stream. The temperature of the contacting can vary over a wide range and will often be determined by the temperature of the environment and the incoming hydrocarbon stream to be treated. The temperature is generally in the range of about −10° C. to 150° C., say about 10° C. to 100° C.

EXAMPLES

The following examples are for purposes of facilitating illustration of the invention and are not in limitation thereof. All parts and percentages are by volume unless otherwise stated or clear from the context.

The following components are used in one or more of the following examples:

Component A: MEA triazine product containing 82 percent 1,3,5-triethanol-s-hexahydrotriazine with the remaining 18 percent being composed of water and monoethanolamine available from Specialty Intermediates, Oklahoma City, Okla.;

Component B: MMA triazine product purportedly containing a 33 percent active, aqueous solution of 1,3,5 trimethyl-s-hexahydrotriazine available from Weatherford International, Inc., Houston, Tex., as SulfaClear® 8250; and Component C: MOPA triazine product containing an 84 percent active, aqueous solution of 1,3,5 (tris 3-methoxypropyl)-s-hexahydrotriazine prepared from 3-methoxypropylamine and formaldehyde.

The water used in the compositions is deionized water.

The following general procedure is used in the examples to evaluate scavenger compositions. A laboratory-scale bubble tower is used which has an inside diameter of about 20 millimeters and a height of about 60 centimeters. At the bottom of the bubble tower is a sparger that generates bubbles having a diameter of approximately 8 millimeters. About 10 milliliters of scavenger composition are placed in the bubble tower.

A gas having an approximate composition of about 94.3 volume percent nitrogen, 5.1 volume percent carbon dioxide and 5900 parts per million by volume of hydrogen sulfide is passed to the sparger at a rate of about 0.40 Standard liters per minute. Although a hydrocarbon gas is not used for purposes of laboratory experiments, the use of the nitrogen and carbon dioxide-containing gas is believed to provide an indication of performance using a hydrocarbon gas.

The temperature of the liquid in the bubble tower is at a temperature of about 25° C. The hydrogen sulfide content of the gas from the bubble tower is monitored by gas chromatography. The flow is continued until hydrogen sulfide breakthrough is observed by the gas chromatograph, and the spent scavenger solution is recovered for evaluation. The spent scavenger solution is visually inspected at about 25° C. In all instances, the spent composition is cooled to about −25° C. for at least 24 hours, and the cooled composition is again visually inspected.

Example 1

Comparative

A scavenger composition is prepared using 50 parts by volume of component A and 50 parts by volume water. This composition is evaluated in the bubble tower and hydrogen sulfide breakthrough begins to occur after about 154 minutes, and the test is terminated at about 202 minutes. Initially the spent scavenger composition appears turbid. Amorphous solids are present in the cooled composition. The solids are not soluble in methanol and appear to be amorphous solids.

Example 2

Comparative

A scavenger composition is prepared using 50 parts by volume of component C and 50 parts by volume water. This composition is evaluated in the bubble tower and hydrogen sulfide breakthrough begins to occur after about 137 minutes, and the test is terminated at about 162 minutes. The spent scavenger composition separates into to liquid phases with no solids being observed in the cooled composition. The denser liquid phase is analyzed by gas chromatography and mass spectroscopy (Rtx®5 silica capillary column, Restek Corporation, Bellefonte, Pa., Varian Saturn 2000 GCMS, available from Agilent Technologies Inc., Santa Clara, Calif.) and is found to contain both the thiadiazine and the dithiazine derived from the MOPA thiazine. The thiadiazine to dithiazine mole ratio is not determined but is estimated to be in the range of 1:3 to 2:3.

Example 3

Comparative

A scavenger composition is prepared using one hundred parts by volume of component B. This composition is evaluated in the bubble tower and hydrogen sulfide breakthrough begins to occur after about 217 minutes, and the test is terminated at about 234 minutes. Crystalline solids are observed before and after the composition is cooled. The solids are soluble in methanol and are crystalline solids from the spent MMA triazine.

Example 4

Comparative

A scavenger composition is prepared using 50 parts by volume of component A, 25 parts by volume of methanol and 25 parts by volume water. This composition is evaluated in the bubble tower, and hydrogen sulfide breakthrough begins to breakthrough after about 129 minutes, the test is terminated at about 145 minutes. The spent scavenger composition appears to be a single liquid phase. When cooled, a few solids are observed.

Example 5

Comparative

A scavenger composition is prepared using fifty parts by volume of component C, 25 parts by volume of methanol and 25 parts by volume water. This composition is evaluated in the bubble tower, and hydrogen sulfide breakthrough begins to breakthrough after about 160 minutes, and the test is terminated after about 186 minutes. Two liquid phases are observed in the cooled composition with the lower phase appearing turbid and without the presence of solids.

Example 6

A scavenger composition is prepared using 25 parts by volume of component C, 50 parts by volume of component B and 25 parts by volume of methanol. In this composition, component C serves as the amphiphilic component. This composition is evaluated in the bubble tower, and hydrogen sulfide breakthrough begins to breakthrough after about 89 minutes, and the test is terminated after about 154 minutes. Two liquid phases are observed. No solids are detected in the cooled composition.

Example 7

A scavenger composition is prepared using 25 parts by volume of component A, 25 parts by volume of component C, 25 parts by volume of methanol and 25 parts by volume of water. This composition is evaluated in the bubble tower, and hydrogen sulfide begins to breakthrough after about 177 minutes, and the test is terminated after about 194 minutes. Two liquid phases are observed. No solids are detected in the cooled composition. The denser liquid phase is analyzed by gas chromatography and mass spectroscopy (Rtx®5 silica capillary column, Restek Corporation, Bellefonte, Pa., Varian Saturn 2000 GCMS, available from Agilent Technologies Inc., Santa Clara, Calif.) and is found to contain both the thiadiazine and the dithiazine derived from the MOPA thiazine and to contain the dithiazine derived from the MEA triazine.

Example 8

A scavenger composition is prepared using 40 parts by volume of component A, 10 parts by volume of component C, 25 parts by volume of methanol and 25 parts by volume of water. This composition is evaluated in the bubble tower, and hydrogen sulfide begins to breakthrough after about 177 minutes, and the test is terminated after about 194 minutes. A single liquid phase is observed. No solids are detected in the cooled composition.

Example 9

A scavenger composition is prepared using 40 parts by volume of component A, 10 parts by volume of component C, 10 parts by volume of them ethylene glycol, 30 parts by volume of methanol and 10 parts by volume of water. This composition is evaluated in the bubble tower, and hydrogen sulfide begins to breakthrough after about 162 minutes, and the test is terminated after about 178 minutes. A single liquid phase is observed. No solids are detected in the cooled composition.

Example 10

A scavenger composition is prepared using 40 parts by volume of component A, 15 parts by volume of component C, 25 parts by volume of methanol and 20 parts by volume of water. This composition is evaluated in the bubble tower, and hydrogen sulfide begins to breakthrough after about 202 minutes, and the test is terminated after about 2188 minutes. A single liquid phase is observed. No solids are detected in the cooled composition which has two liquid phases.

Example 11

Comparative

A scavenger composition is prepared using 50 parts by volume of component B and 50 parts by volume of methanol. This composition is evaluated in the bubble tower, and hydrogen sulfide begins to breakthrough after about 81 minutes, and the test is terminated after about 122 minutes. Crystalline solids are observed in the cooled composition.

Example 12

A scavenger composition is prepared using 25 parts by volume of component A, 25 parts by volume of component B, 25 parts by volume of methanol and 25 parts by volume of water. In this composition component A serves as an amphiphilic component. This composition is evaluated in the bubble tower, and hydrogen sulfide begins to breakthrough after about 98 minutes, and the test is terminated after about 120 minutes. The liquid is turbid but a single phase to the naked eye. Solids are present before cooling and the amount of solids appears to increase after cooling.

Example 13

A scavenger composition is prepared using 25 parts by volume of component A, 12.5 parts by volume of component B, 12.5 parts by volume of component C, 25 parts by volume of methanol and 25 parts by volume of water. In this composition components A and C serve as amphiphilic components. This composition is evaluated in the bubble tower, and hydrogen sulfide begins to breakthrough after about 106 minutes, and the test is terminated after about 129 minutes. Two liquid phases are observed; however, the lower phase appears turbid but contains no observable solids before and after cooling.

Example 14

A scavenger composition is prepared using 40 parts by volume of component A, 10 parts by volume of component B, 25 parts by volume of methanol and 25 parts by volume of water. In this composition component A serves as an amphiphilic component. This composition is evaluated in the bubble tower, and hydrogen sulfide begins to breakthrough after about 122 minutes, and the test is terminated after about 145 minutes. Two liquid phases are observed, and the lower phase appears clear with no observable solids before and after cooling.

Example 15

A scavenger composition is prepared using 40 parts by volume of component A, 5 parts by volume of component B, 5 parts by volume of component C, 25 parts by volume of methanol and 25 parts by volume of water. In this composition components A and C serve as amphiphilic components. This composition is evaluated in the bubble tower, and hydrogen sulfide begins to breakthrough after about 130 minutes, and the test is terminated after about 154 minutes. Two liquid phases are observed, and the lower phase appears clear with no observable solids before and after cooling.

Example 16

A scavenger composition is prepared using 45 parts by volume of component A, 5 parts by volume of component B, 25 parts by volume of methanol and 25 parts by volume of water. In this composition component A serves as an amphiphilic component. This composition is evaluated in the bubble tower, and hydrogen sulfide begins to breakthrough after about 114 minutes, and the test is terminated after about 138 minutes. No phase separation is observed, and no solids are observable before and after cooling.

Example 17

A scavenger composition is prepared using 42 parts by volume of component A, 8 parts by volume of component B, 25 parts by volume of methanol and 25 parts by volume of water. In this composition component A serves as an amphiphilic component. This composition is evaluated in the bubble tower, and hydrogen sulfide begins to breakthrough after about 138 minutes, and the test is terminated after about 162 minutes. A single liquid phase is observed; however, waves in the clear liquid are detected and are believed to be an indication of a separate observable liquid phase beginning to be formed. The lower phase appears clear after cooling with no observation of any solids.

Example 18

A scavenger composition is prepared using 35 parts by volume of component A, 15 parts by volume of component B, 25 parts by volume of methanol and 25 parts by volume of water. In this composition component A serves as an amphiphilic component. This composition is evaluated in the bubble tower, and hydrogen sulfide begins to breakthrough after about 122 minutes, and the test is terminated after about 138 minutes. Two liquid phases are observed, and the lower phase appears clear with the presence of a slight amount of solids. The amount of solids observed did not increase after cooling.

Example 19

Comparative

A scavenger composition is prepared using 30 parts by volume of component A, 20 parts by volume of component B, 25 parts by volume of methanol and 25 parts by volume of water. In this composition component A serves as an amphiphilic component. This composition is evaluated in the bubble tower, and hydrogen sulfide begins to breakthrough after about 122 minutes, and the test is terminated after about 145 minutes. Two liquid phases are observed, and the cooled composition appears to have solids.

It is believed that the component B used in Examples 12 through 19 became partially deactivated due to extended storage.

It is claimed:

1. A process for reducing an amount of sulfhydryl moieties in hydrocarbon streams comprising contacting in the presence of water and at least one amphiphilic moiety said hydrocarbon streams with at least one substituted hexahydrotriazine that is substantially devoid of hydroxyl groups but is soluble in water, for a time sufficient to provide a spent triazine in which at least one hetero nitrogen atom is replaced with a sulfur atom and wherein the amphiphilic moiety is provided in an amount sufficient to form a hydrophobic micelle with said spent triazine, with the proviso that the hexahydrotriazine and amphiphilic moiety are different.

2. The process of claim 1 wherein the substituted hexahydrotriazines is represented by the formula

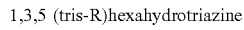

1,3,5 (tris-R)hexahydrotriazine wherein each R is the same or different and may be alkyl including branched alkyl of 1 to 20 carbon atoms; aryl of 5 to 10 carbon atoms; alkoxyalkylene of 2 to 20 carbon atoms; and alkyleneamines of 1 to 20 carbon atoms.

3. The process of claim 2 wherein the amphiphilic moiety comprises a hydroxyl or alkoxy-containing organic compounds having at least about 4 carbon atoms.

4. The process of claim 3 wherein the amphiphilic moiety comprises a hexahydrotriazine substituted with hydroxyalkyl and alkoxyalkylene groups of 1 to 20 carbon atoms.

5. The process of claim 4 wherein the amphiphilic moiety comprises at least one of MEA triazine, MOPA triazine, and 1,3,5 (tris-methoxyethyl) hexahydrotriazine and partially or fully spent derivatives thereof; benzyl alcohol, benzyl ethers of 1 to 6 carbons; phenol; and alkylphenolalkoxylates of up to 30 carbons.

6. A process for reducing an amount of sulfhydryl moieties in hydrocarbon streams comprising contacting in the presence of water a composition comprising MEA triazine and at least one of MMA triazine and MOPA triazine for a time sufficient to provide a spent triazine in which at least one hetero nitrogen atom is replaced with a sulfur atom, wherein each of the MEA triazine and MMA triazine are provided in an amount sufficient to avoid the formation of solids.

7. The process of claim 6 wherein the composition comprises MEA triazine and MOPA triazine.

8. The process of claim 7 wherein the mole ratio of MOPA triazine to MEA triazine is in the range of about 1:4 to 1:25.

9. The process of claim 6 wherein the composition comprises MEA triazine and MMA triazine.

10. The process of claim 6 wherein the mole ratio of MMA triazine to MEA triazine is in the range of about 1:4 to 1:25.

* * * * *